United States Patent Office 3,055,806
Patented Sept. 25, 1962

3,055,806
PROCESS FOR THE MANUFACTURE OF 11α,18-DIHYDROXY-PROGESTERONE
Albert Wettstein, Riehen, Ernst Vischer and Jakob Urech, Basel, and Oskar Jeger, Zurich, Switzerland, assignors to Ciba Corporation, a corporation of Delaware
No Drawing. Filed Aug. 9, 1960, Ser. No. 48,346
Claims priority, application Switzerland Aug. 11, 1959
5 Claims. (Cl. 195—51)

The present invention provides a process for the manufacture of 11α:18-dihydroxy-progesterone by microbiological means with good yields.

In British Patent No. 805,602, granted April 1, 1959, to Ciba Limited, it has been disclosed that saturated or unsaturated pregnanes that contain an oxo group in positions 3 and 20 and are hydroxylated in position 18 can be hydroxylated in position 11 by the action of enzymes capable of bringing about oxygenation in position 11. Thus, for example, 18-hydroxy-progesterone is converted into 11α:18-dihydroxy-progesterone with the aid of Rhizopus nigricans according to the process of the aforementioned British patent.

The present invention is based on the observation that the 11α-oxygenation of 18-hydroxy-progesterone with Rhizopus nigricans or with various other representatives of the order Mucorales, such, for example, as other species of Rhizopus, for example Rhizopus arrhizus or species of the genus Mucor, gives a relatively poor yield and often takes a non-uniform course. A mixture thus formed can be separated only with the use of complicated purification methods, such as chromatography or counter-current distribution, so that the manufacture of 11α:18-dihydroxy-progesterone in this way involves very considerable difficulty.

The present invention is based on the observation that enzymes of the fungus *Aspergillus ochraceus* (Ciba strain No. 924) convert 18-hydroxy-progesterone almost quantitatively into 11α:18-dihydroxy-progesterone. The formation of possibly produced by-products can be extensively inhibited by maintaining suitable fermentation conditions, whereby the yield of 11α:18-dihydroxy-progesterone is accordingly increased.

The conversion of 18-hydroxy-progesterone to 11α:18-dihydroxy-progesterone with the afore-mentioned *Aspergillus ochraceus*, or with the enzymes obtained therefrom respectively, can be carried out in the manner conventionally used for microbiological hydroxylation. In general, the starting material is incubated directly with a culture of the specified strain grown under aerobic conditions. It is of advantage to agitate, that is to say shake or stir, the culture which contains assimilable carbon, more especially carbohydrates, and if desired also growth-promoting substances, for example corn steep liquor or beer wort, and inorganic salts. Thus, the nutrient solutions to be used may be natural, synthetic or semi-synthetic. The process which is simplest to perform on an industrial scale is described hereinbelow without limiting the scope of the invention thereto:

The organism is grown in apparatus and under similar conditions as are known as the so-called deep-tank process in the manufacture of antibiotics. The temperature is advantageously maintained within a range of 24–27° C., and at such a temperature the culture will develop fully within 1 to 2 days. The starting material is then added under sterile conditions, either as a fine dispersion or in solution, for example in methanol, ethanol, acetone, dioxane or propylene glycol, and the incubation is then continued. Finally, the mycelial mass is isolated, if desired extracted, for example with methanol or acetone, and the extract is evaporated and added to the culture filtrate. The latter is extracted with a suitable organic solvent, such as ethyl acetate, chloroform, ethylene chloride or methylene chloride, the extract is washed with dilute sodium bicarbonate solution and with water and finally evaporated. 11α:18-dihydroxy-progesterone can be isolated from the residue, for example, in one of the following ways: The residue is crystallised directly from a suitable solvent such, for example, as acetone+petroleum ether, methylene chloride+ether, aequeous methanol or the like, or else it is first subjected to one of the following preliminary treatments: Distribution between petroleum ether and methanol+water (80:20) which causes the product of the invention to concentrate in the methanolic phase; treatment of a solution of the residue in a suitable solvent such, for example, as methanol, ethanol, acetone or the like with an adsorbent such as active carbon; filtration of a solution of the residue, for example in a mixture of methylene chloride and acetone, through 10 times its weight of silica gel, whereby the 11α:18-dihydroxy-progesterone passes through the adsorbent, while by-products of higher polarity and impurities are being adsorbed therein.

The 18-hydroxy-progesterone used as starting material in the present process is known and can be prepared, for example, according to U.S. Patent No. 2,891,948, granted June 23, 1959, to Raphael Pappo.

The 11α:18-dihydroxy-progesterone obtained by the present process is a crystalline compound which shows a melting point of 195–197° and displays a band at 242 mµ in the ultra-violet absorption spectrum.

Paper-chromatography in various solvent systems reveals the following $R_F$-values:

Formamide/benzene _____ $R_F$=0.08
Formamide/benzene+chloroform (1:1)_____ $R_F$=0.29
Bush B 1 [Petroleum ether+toluene+methanol+water (25:25:35:15)]_____ $R_F$=0.56
Bush BL 1 [Petroleum ether+benzene+methanol+water (3:7:5:5)]_____ $R_F$=0.85

11α:18-dihydroxy-progesterone is a valuable intermediate for the synthesis of other 18-oxygenated steroids such, for example, as aldosterone or 9α-fluoro-18-hydroxycorticosterone-acetate, described in U.S. Patent No. 2,917,510, granted December 15, 1959, to Albert Wettstein et al.

The latter compound may be obtained for instance by splitting off the 11α-hydroxy group by dehydration with formation of a 9:11 double bond, formation of the 9:11β-epoxide, splitting up this epoxide with hydrofluoric acid and introduction of a 21-hydroxy group, e.g. by way of a 21-hydroxylating microorganism, such as e.g. *Ophiobolus herpotrichus*.

The following examples illustrate the invention.

*Example 1*

A nutrient solution is prepared which contains in 1 liter: 10 grams of crude glucose, 10 grams of distillers' solubles, 5 grams of sodium chloride, 1 gram of sodium acetate and 10 grams of calcium carbonate, and it is then adjusted to pH=7.9. 40 cc. of this suspension are sterilised in an agitating vessel for 30 minutes under a pressure of 1.1 atmospheres (gauge). The whole is cooled to room temperature, and the suspension is inoculated with a culture of *Aspergillus ochraceus* (Ciba strain No. 924) and agitated for 30 hours at 25–28° C., after which time the organism has developed well. Under sterile conditions 10 mg. of 18-hydroxy-progesterone in 0.5 cc. of acetone are then added, and the mixture is shaken for 3 days longer. The mycelial mass is separated, washed 3 times with 40 cc. of ethyl acetate, and the washings are used in series for the extraction of the aqueous culture filtrate. The ethyl acetate extracts are washed with sodium chloride solution of 10% strength, dried over sodium sulfate, filtered and evaporated at 40° C. under reduced pressure. The amorphous residue (13 mg.) is subjected to paper-chromatographic examination; it consists practically entirely of 11α:18-dihydroxy-progesterone. The latter product gives with sodium hydroxide solution in ultra-violet light of a wavelength of 360 mμ an intense yellow fluorescence; it does not reduce blue tetrazole chloride. It reveals the following $R_F$ values at 22° C:

| | |
|---|---|
| Formamide/benzene | $R_F$=0.08 |
| Formamide/benzene+chloroform (1:1) | $R_F$=0.29 |
| Bush B 1 [Petroleum ether+toluene+methanol+water (25:25:35:15)] | $R_F$=0.56 |
| Bush BL 1 [Petroleum ether+benzene+methanol+water (3:7:5:5)] | $R_F$=0.85 |

The afore-mentioned main product contains a small proportion of steroids of higher polarity.

The crude reaction product is chromatographed on 0.6 gram of silica gel. With a mixture of benzene and acetone (4:1) 8.9 mg. of paper-chromatographically unitary 11α:18-dihydroxy-progesterone are eluted which, after recrystallization from a mixture of acetone and ether, melts at 195–197° C. The ultraviolet spectrum of the substance in ethanol reveals a maximum at 242 mμ ($\epsilon$=15,600).

*Example 2*

The procedure described in Example 1 is carried out with a nutrient solution containing per liter: 2.6 grams of tartaric acid, 2.6 grams of ammonium tartrate, 0.17 gram of ammonium sulfate, 0.4 gram of potassium carbonate, 0.27 gram of magnesium carbonate and 50 grams of crude glucose. When the reaction is then performed in a manner similar to that described in Example 1, 18-hydroxy-progesterone yields 11α:18-dihydroxy-progesterone.

What is claimed is:

1. Process for the manufacture of 11α:18-dihydroxy-progesterone by microbiological means by treating 18-hydroxy-progesterone with an enzyme of 11α-oxygenating fungi, wherein an enzyme of the fungus *Aspergillus ochraceus*, Ciba strain No. 924, is used.

2. Process as claimed in claim 1, wherein 18-hydroxy-progesterone is incubated directly with an aerobically grown culture of the fungus *Aspergillus ochraceus*, Ciba strain No. 924.

3. Process as claimed in claim 1, wherein the fermentation liquor is extracted after incubation with an organic water-immiscible solvent and 11α:18-hydroxy-progesterone isolated from the crude extract.

4. Process as claimed in claim 1, wherein the crude product obtained by extracting the fermentation broth with an organic solvent is treated with a two-phase system consisting of petroleum ether and methanol water (80:20), evaporating the methanol phase and recrystallizing the residue.

5. Process as claimed in claim 1, in which the crude product obtained by extracting the fermentation broth with an organic solvent is dissolved in a mixture of methylene-chloride and acetone and the solution passed through a column of 10 times its weight of silica gel, evaporating the filtrate and recrystallizing the residue.

References Cited in the file of this patent

UNITED STATES PATENTS

| | | |
|---|---|---|
| 2,649,402 | Murray et al. | Aug. 18, 1953 |
| 2,802,775 | Dulaney et al. | Aug. 13, 1957 |
| 2,905,593 | Dulaney | Sept. 22, 1959 |

UNITED STATES PATENT OFFICE
CERTIFICATE OF CORRECTION

Patent No. 3,055,806　　　　　　　　　　　　September 25, 1962

Albert Wettstein et al.

It is hereby certified that error appears in the above numbered patent requiring correction and that the said Letters Patent should read as corrected below.

Column 4, line 13, for "-hydroxy-" read ---dihydroxy- --.

Signed and sealed this 5th day of May 1964.

(SEAL)
Attest:

ERNEST W. SWIDER　　　　　　　　　　　　EDWARD J. BRENNER
Attesting Officer　　　　　　　　　　　　　Commissioner of Patents